(12) United States Patent
Lau et al.

(10) Patent No.: US 7,899,847 B2
(45) Date of Patent: Mar. 1, 2011

(54) SYSTEM AND METHOD FOR AUTHORING NEW LIGHTWEIGHT WEB APPLICATIONS USING APPLICATION TRACES ON EXISTING WEBSITES

(75) Inventors: Tessa Ann Lau, Mountain View, CA (US); Jeffrey William Nichols, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 12/336,903

(22) Filed: Dec. 17, 2008

(65) Prior Publication Data

US 2010/0153515 A1     Jun. 17, 2010

(51) Int. Cl.
*G06F 17/30* (2006.01)
(52) U.S. Cl. .......... 707/803; 707/809; 709/224; 709/219
(58) Field of Classification Search .................. 707/795, 707/790, 803, 809, 708; 709/217, 219, 206, 709/224; 715/234, 513; 726/26, 1
See application file for complete search history.

(56) References Cited

U.S. PATENT DOCUMENTS

| | | | |
|---|---|---|---|
| 6,857,102 | B1 | 2/2005 | Bickmore et al. |
| 2002/0099829 | A1 | 7/2002 | Richards et al. |
| 2007/0050708 | A1* | 3/2007 | Gupta et al. .................. 715/513 |
| 2007/0083602 | A1* | 4/2007 | Heggenhougen et al. .... 709/206 |
| 2008/0208817 | A1* | 8/2008 | Allsop et al. .................. 707/708 |
| 2009/0024574 | A1* | 1/2009 | Timmons ...................... 707/708 |
| 2009/0119268 | A1* | 5/2009 | Bandaru et al. ............... 707/708 |
| 2009/0125977 | A1* | 5/2009 | Chander et al. ................... 726/1 |
| 2009/0288169 | A1* | 11/2009 | Petta et al. ....................... 726/26 |
| 2010/0083095 | A1* | 4/2010 | Nikovski et al. .............. 715/234 |

FOREIGN PATENT DOCUMENTS

EP     01331559 A2     7/2003

OTHER PUBLICATIONS

Adipat, et al, "Adaptive and Personalized Interfaces for Mobile Web," University of Maryland, Baltimore County.
Anderson, et al., "Personalizing Web Sites for Mobile Users," in *Proceedings of the 10th international conference on World Wide Web*. 2001. Hong Kong. pp. 565-575.

(Continued)

*Primary Examiner* — Le Luu
(74) *Attorney, Agent, or Firm* — Gibb I.P. Law Firm, LLC (57) ABSTRACT

Disclosed are embodiments of an invention for assisting a user with creating a customized web application from an existing web application. The embodiments use a first computer system to access an existing website. As a user performs a task on the existing website, a software application for a new website is authored by processor(s) on the first computer system and/or a second computer system in communication with the first computer system based on traced interactions between the user and the existing website. Additionally, a storyboard for the new website is developed. The storyboard will contain screens with both automatically-clipped and user-clipped content from the existing website. Navigation details for the transitions between the storyboard screens are provided based on the recorded interaction events. Once developed, the software application for the new website can be uploaded to a proxy server through which it can be accessed by another computer system (e.g., a mobile device) and used to perform the same or similar tasks on the other device.

20 Claims, 5 Drawing Sheets

OTHER PUBLICATIONS

Banavar, et al., "An Authoring Technology for Multidevice Web Applications." *IEEE Pervasive Computing*, 2004. 3(3): pp. 83-93.

Bickmore, et al., in *Selected papers from the sixth international conference on World Wide Web*. 1997. Santa Clara, CA. pp. 1075-1082.

Bila, et al. "PageTailor: Reusable End-User Customization for the Mobile Web," in *Proceedings of MobiSys*. 2007. San Juan, Puerto Rico. pp. 16-25.

Bouillon, et al. "Recovering Alternative Presentation Models of a Web Page with Vaquita," in *Computer-Aided Design of User Interfaces III*. 2002. pp. 311-322.

Clark, et al., "XML Path Language (XPath), Version 1.0," 1999. http://www.w3.org/TR/xpath.

Fujima, et al. "Clip, connect, clone: combining application elements to build custom interfaces for information access," in *Proceedings of the 17th annual ACM symposium on User interface software and technology*. 2004. pp. 175-184.

Hartmann, et al., "Programming by a Sample: Rapidly Creating Web Applications with d.mix," in *Proceedings of the 20th annual ACM symposium on User interface software and technology*. 2007. Newport, RI. pp. 241-250.

Leshed, et al., "Co-Scripter: Automating & Sharing How-To Knowledge in the Enterprise," in *Proceedings of CHI*. 2008. Florence, Italy. To Appear.

Nichols, et al., "Highlight: A System for Creating and Deploying Mobile Web Applications," in *Proceedings of the ACM UIST* Oct. 19-22, 2008, Monterey, CA.

Online Publishers Association, "Going Mobile: An International Study of Content Use and Advertising on the Mobile Web," 2007. http://www.online-publishers.org./media/176_W_opa_going_mobile_report_mar07.pdf.

* cited by examiner

SYSTEM AND METHOD FOR AUTHORING NEW LIGHTWEIGHT WEB APPLICATIONS USING APPLICATION TRACES ON EXISTING WEBSITES

BACKGROUND

1. Field of the Invention

The embodiments of the invention generally relate to authoring web applications for use on mobile devices and, more specifically, to a system and method for assisting a user with creating a customized lightweight web application from an existing web application.

2. Description of the Related Art

Today's websites provide many useful features, but unfortunately nearly all are designed first and foremost for the desktop form factor (i.e., for use on devices having significant computer processing functions). At the same time, the number of mobile devices with different form factors and unique input and output facilities is growing substantially. Many websites now have mobile versions (i.e., have software applications for websites that can be executed on mobile devices, such as cell phones, personal digital assistants (PDAs), etc). These mobile versions of websites are often designed for use on minimally functional mobile devices (i.e., devices with limited computer processing capabilities) and, thus, provide only a small subset of the functionality of the website. Moreover, the cost of producing such mobile versions of websites is such that only the most widely-used applications have them. Less popular applications, such as most enterprise applications, are rarely supported on mobile devices. Employees who need to perform tasks on the road are left with an extremely limited ability to conduct work processes on their intranets using mobile devices.

Early work on creating mobile interfaces focused primarily on two approaches. The first approach automatically modified existing interfaces based on heuristic rules or machine learning algorithms. The second approach created tools that allow website builders to model their site and use those models to create new versions of their site for multiple mobile devices.

Many of the first systems to create mobile interfaces attempted to use the automatic approach. One such system used sets of heuristic rules to modify pages, such as "replace each text block with its first sentence" (see Bickmore, T. W. and Schilit, B. N. "Digestor: Device-independent Access to the World Wide Web," in *Selected papers from the sixth international conference on World Wide Web,* 1997, Santa Clara, Calif. pp. 1075-1082). Other automatic approaches have analyzed users' browsing history to improve mobile interfaces (e.g., see Anderson, C. R., Domingos, P., and Weld, D. S. "Personalizing Websites for Mobile Users," in *Proceedings of the 10th international conference on World Wide Web,* 2001, Hong Kong, pp. 565-575) such as by increasing the prominence of links that users often follow. These automatic schemes were also limited to making small changes to the interface.

Other systems have used a model-based approach to creating mobile web interfaces. For example, one such system uses a tool and some heuristic rules for reverse engineering a web page into a XIML presentation model that could later be transformed for use on other devices (see Bouillon, L., Vanderdonckt, J., and Souchon, N. "Recovering Alternative Presentation Models of a Web Page with Vaquita," in *Computer-Aided Design of User Interfaces III,* 2002, pp. 311-322). In contrast, another system starts with the designer creating a generic interface model for their web page and then provides tools to transform the generic interface for use on a variety of different devices (see Banavar, G., Bergman, L., Cardone, R., and Chevalier, V., "An Authoring Technology for Multidevice Web Applications", *IEEE Pervasive Computing,* 2004, 3(3): pp. 83-93). These systems require significant knowledge of abstract modeling and programming to use.

A few projects have investigated the idea of allowing end users to create their own user interfaces from those found on websites. One such system allows users to clip elements from existing web pages onto a separate panel and then link the elements together to create useful combined applications (see Fujima, J., Lunzer, A., Hornbaek, K., and Tanaka, Y. "Clip, connect, clone: combining application elements to build custom interfaces for information access," in *Proceedings of the 17th annual ACM symposium on User interface software and technology,* 2004, pp. 175-184). However, interfaces created in this manner exist entirely on one page and were not designed to work on a mobile device.

Another system allows users to create mash-ups by combining elements found in existing web applications (see Hartmann, B., Wu, L., Collins, K., and Klemmer, S. R. "Programming by a Sample: Rapidly Creating Web Applications with d.mix," in *Proceedings of the 20th annual ACM symposium on User interface software and technology.,* 2007, Newport, R.I. pp. 241-250). This system supports creation of mobile interfaces, but appears to require users to create and edit scripts written in the specified programming language.

Yet another system comprises a tool that allows users to remove, resize or move web page elements while browsing on a mobile device (see Bila, N., Ronda, T., Mohomed, I., Truong, K. N., and Lara, E.d. "PageTailor: Reusable End-User Customization for the Mobile Web," in *Proceedings of MobiSys,* 2007, San Juan, Puerto Rico. pp. 16-25). This tool runs directly on a mobile device, and studies have shown that its modification algorithms are robust to website changes over long periods of time. However, while it can be used to modify the content of pages, it does not allow users to specify the transitions between pages. Furthermore, it requires the mobile device to download most of the content of every web page, because the modification algorithms are run directly on the mobile device.

Common to all of these approaches is the idea that content will need to be modified for use on the mobile device. Researchers have also been designing new interaction techniques in an attempt to replicate the experience of browsing a web page on a typical desktop browser within the constraints of the mobile browsing environment. While these techniques may have had some success, there is still a need in the art for content modification approaches that are smaller and easier to navigate than regular web pages. If such modified pages can be designed to contain the correct content and features, then they are likely to be easier to use.

SUMMARY

Disclosed herein are embodiments of a system and method for assisting a user with creating a customized lightweight web application from an existing web application (e.g., a mobile version of an existing website). The embodiments involve using a first computer system to access an existing website. As a user performs a task on the existing website, a software application for a new website is authored on the first computer system and/or a second computer system based on the interactions between the user and the existing website. Specifically, as the task is being performed, the user's interactions with the existing website are automatically traced. Additionally, a storyboard for the new website is developed.

The storyboard will contain screens with both automatically-clipped and user-clipped content from the existing website. Navigation details for the transitions between the storyboard screens are provided based on the recorded interactions. Once developed, the software application for the new website can be uploaded to a proxy server through which it can be accessed by another computer system (e.g., a mobile device) and used to perform the same or similar tasks on the other device.

More particularly, disclosed herein are embodiments of a system for authoring, storing and accessing a computer software application for a new website. The system embodiments can comprise a first computer system, an optional second computer system, a proxy server and at least one third computer system (e.g., a mobile device).

The first computer system can comprise a graphical user interface (GUI), an internet connection, and a monitoring device. The GUI in conjunction with the internet connection can allow a user to access an existing website and to further perform a task on the existing website. The monitoring device can trace interactions between the user and the existing website, during task performance.

The first computer system and/or an optional second computer system in communication with the first computer system can comprise one or more processor(s). The processor(s) can execute a website design application for authoring the computer software application for the new website based on the interactions. The authoring process executed by the processor(s) can comprise, during task performance, automatically extracting, for the new website, any content from the existing website with which the user interacts. It can also comprise, during task performance, allowing a user to select and extract, for the new website, additional content from the existing website. Finally, the results acquired from tracing the interactions between the user and the existing website can be used to provide the navigational details for any transitions between content on the new website.

The proxy server can receive the computer software application for the new website from the first computer system (or the optional second computer system) and can further store the computer software application. The third computer system(s) can access the computer software application for the new website through the proxy server and can use it to perform the same or similar tasks as performed previously using the existing website.

Also, disclosed herein are embodiments of an associated method. The method embodiments generally comprise accessing an existing website and performing a task on the existing website. These processes can be performed by a user through a first computer system having both an internet connection and a graphical user interface (GUI). As the user performs the task, interactions (i.e., interaction events, such as activation of links or buttons, entering of text into form fields, etc.) between the user and the existing website can be automatically traced, for example, by a monitoring device on the first computer system. That is, during this tracing process, all events occurring during each interaction between the user and existing website can be recorded (e.g., on a data storage device within the first computer system). Based on these interaction events, the computer software application for the new website is authored (e.g., by a website design application executed on the first computer system and/or on an optional second computer system in communication with the first computer system).

Specifically, this authoring process can comprise, during the performance of the task, automatically extracting, for the new website, any content from the existing website with which the user interacts. Also, during the performance of the task, the user can be allowed to select and extract, for the new website, additional content from the existing website. Finally, the results acquired from tracing the interaction events between the user and the existing website can be used to provide the navigational details for the transition between content on the new website. Once the software application for the new website is authored, it can be uploaded onto a proxy server. Through the proxy server, one or more third computer systems (e.g., one or mobile devices) can access the new website and use it to perform the same or similar tasks as performed previously using the existing website.

One particular method embodiment of the present invention can again comprise accessing an existing website and performing a task on the existing website. These processes can be performed by a user through a first computer system having both an internet connection and a graphical user interface (GUI). As discussed above, as the user performs the task, interaction events between the user and the existing website can be automatically traced (e.g., by a monitoring device on the first computer system) and recorded (e.g., on a data storage device within the first computer system). Based on these interaction events, the computer software application for the new website can authored (e.g., by a website design application executed on the first computer system and/or on an optional second computer system in communication with the first computer system).

Specifically, this authoring process can comprise developing, for the new website, a storyboard comprising screens that contain content extracted from the existing website. To develop the storyboard, some content is automatically extracted from the existing website and added to the screens of the storyboard. The automatically extracted and added content is content with which the user interacts on any given webpage of the existing website. Specifically, for each particular webpage that is on the existing website and that is viewed by the user during task performance, the method comprises automatically extracting and adding, to a corresponding screen on the storyboard, any content with which the user interacts. Additionally, the user can be allowed to further select specific content from at least one particular webpage on the existing website and to add the specific content to the corresponding screen (e.g., by using an authoring tool in the website design application as displayed on the GUI). Finally, navigation details for the transitions between the screens on the storyboard can be provided based on the traced interaction events. Once the software application for the new website is authored, it can be uploaded onto a proxy server. Through the proxy server, one or more third computer systems (e.g., one or more mobile devices) can access the new website and use it to perform the same or similar tasks as performed previously using the existing website.

Also disclosed herein is a computer program product comprising a computer usable medium having computer useable program code embodied therewith. The computer usable program code is configured to perform the above-described method for authoring of a computer software application for a new website.

BRIEF DESCRIPTION OF THE SEVERAL VIEWS OF THE DRAWINGS

The embodiments of the invention will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

Today's websites provide many useful features, but unfortunately nearly all are designed first and foremost for the desktop form factor (i.e., for use on devices having significant computer processing functions). At the same time, the number of mobile devices with different form factors and unique input and output facilities is growing substantially. Many websites now have mobile versions (i.e., have software applications for websites that can be executed on mobile devices, such as cell phones, personal digital assistants (PDAs), etc.). These mobile versions of websites are often designed for use on minimally functional mobile devices (i.e., devices with limited computer processing capabilities) and, thus, provide only a small subset of the functionality of the website. Moreover, the cost of producing such mobile versions of websites is such that only the most widely-used applications have them. Less popular applications, such as most enterprise applications, are rarely supported on mobile devices. Employees who need to perform tasks on the road are left with an extremely limited ability to conduct work processes on their intranets using mobile devices.

Early work on creating mobile interfaces focused primarily on two approaches. The first approach automatically modified existing interfaces based on heuristic rules or machine learning algorithms. The second approach created tools that allow website builders to model their site and use those models to create new versions of their site for multiple mobile devices. Common to these approaches is the idea that content will need to be modified for use on the mobile device. Researchers have also been designing new interaction techniques in an attempt to replicate the experience of browsing a web page on a typical desktop browser within the constraints of the mobile browsing environment. While these techniques may have had some success, there is still a need in the art for content modification approaches that are smaller and easier to navigate than regular web pages. If such modified pages can be designed to contain the correct content and features, then they are likely to be easier to use.

In view of the foregoing, disclosed herein are embodiments of a system and method for assisting a user with creating a customized lightweight web application from an existing web application (e.g., a mobile version of an existing website). The embodiments involve using a first computer system to access an existing website. As a user performs a task on the existing website, a software application for a new website is authored either on the first computer system and/or a second computer system based on the interactions between the user and the existing website. Specifically, as the task is being performed, the user's interactions with the existing website are automatically traced. Additionally, a storyboard for the new website is developed. The storyboard will contain screens with both automatically-clipped and user-clipped content from the existing website. Navigation details for the transitions between the storyboard screens are provided based on the recorded interactions. Once developed, the software application for the new website can be uploaded to a proxy server through which it can be accessed by another computer system (e.g., a mobile device) and used to perform the same or similar tasks on the other device.

Figure 1:
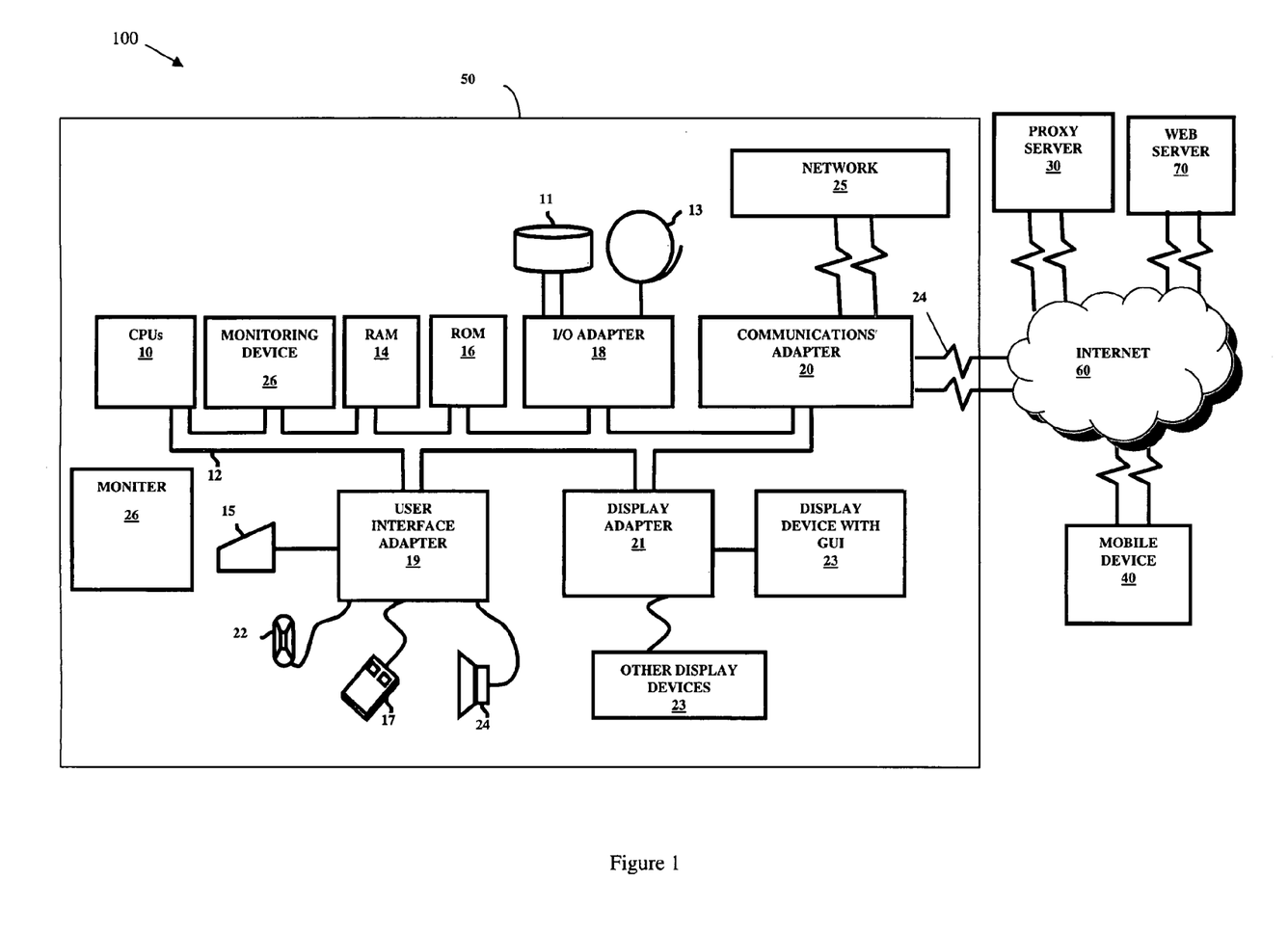
FIG. 1 is a schematic diagram illustrating an embodiment of a system of the present invention.

Referring to FIG. 1, disclosed herein are embodiments of a system 100 for authoring, storing and accessing a computer software application for a new website (e.g., a customized lightweight web application for use by a mobile device). The system 100 embodiments can comprise a first computer system 50, an optional second computer system (not shown), at least one third computer system 40 (e.g., at least one mobile device) and a proxy server 30 in communication with the first computer system 50, the optional second computer system, and the third computer system 40 via internet 60 connections 24.

Generally, the first computer system 50 can comprise a standard desktop or laptop computer system. Specifically, the first computer system 50 can comprise at least one processor or central processing unit (CPU) 10. The CPUs 10 can be interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The first computer system 50 can further read any inventive instructions (e.g., a website design application, as discussed in detail below) stored on one or more of the program storage devices 11, 13 and can follow these instructions to execute the methodology of the embodiments of the invention (also as discussed in detail below). The first computer system 50 can further comprise a user interface adapter 19 that connects a keyboard 15, mouse 17, speaker 24, microphone 22, and/or other user interface devices such as a touch screen device (not shown) to the bus 12 to gather user input. Additionally, a communication adapter 20 can enable the first computer system 50 and, more particularly, the bus 12 to connect with a data processing network 25 and/or the internet 60 (e.g., see internet connection 24). A display adapter 21 can further connect the bus 12 to one or more display devices 23. Such display devices 23 can include, but are not limited to, a video monitor adapted to display a graphical user interface (GUI) or any other display devices embodied as an output device such as a printer or transmitter. The first computer system 50 can further comprise a monitoring device 26 for tracing internet activity. This monitoring device 26 comprise a separate device (as shown) or may be implemented through the use of monitoring software stored in one or more of the data storage devices 11, 13 and executed by one of the CPUs 10.

Configured in this manner, the first computer system 50 can be used to assist a user with authoring a computer software application for a new website (e.g., a customized lightweight web application). Specifically, the GUI 23 in conjunction with the internet connection 24 can allow a user to access an existing website over the internet 60 through a web server 70 for the existing website and to further perform a task on the existing website. The monitoring device 26 can trace interactions (i.e., interaction events) between the user and the existing website, during task performance. That is, the monitoring device 26 can detect and record, on a data storage device 11, 13, all interaction events occurring during each interaction between the user and the existing website. Such interaction events can include, but are not limited to, activating links or buttons, filling in form fields (e.g., sign-in forms with login and password blocks, billing information forms, etc.), etc.

Additionally, the processor(s) 10 can execute the website design application stored on any one or more of the data storage devices 11, 13. This website design application can particularly comprise computer useable program code (i.e., instructions) for authoring computer software applications for the new websites based on user interactions (i.e., on the traced interaction events) with existing website.

The authoring process executed by the processor 10 using such the inventive website design application of the present invention can comprise, during task performance, automatically extracting, for the new website, any content from the existing website with which the user interacts. It can also comprise, during task performance, allowing a user to select and extract, for the new website, additional content from the existing website. Finally, the results acquired from tracing the interaction events between the user and the existing website can be used to provide the navigational details for any transitions between content on the new website. That is, each transition (i.e., each transition event) between content on the new website can comprise navigational details made up of that series of one or more interaction events that a user performed previously in order to transition between corresponding content on the existing website.

As described above and illustrated in FIG. 1, the first computer system 50 comprises the processor(s) 10 that perform the authoring process. However, alternatively, a discrete second computer system (e.g., a server) in communication with the first computer system 50 (e.g., over internet 60) can comprise such processor(s) 10 for performing the authoring process. Alternatively, processors 10 in both the first and second computers systems can work in combination to perform the authoring process.

Figure 2:
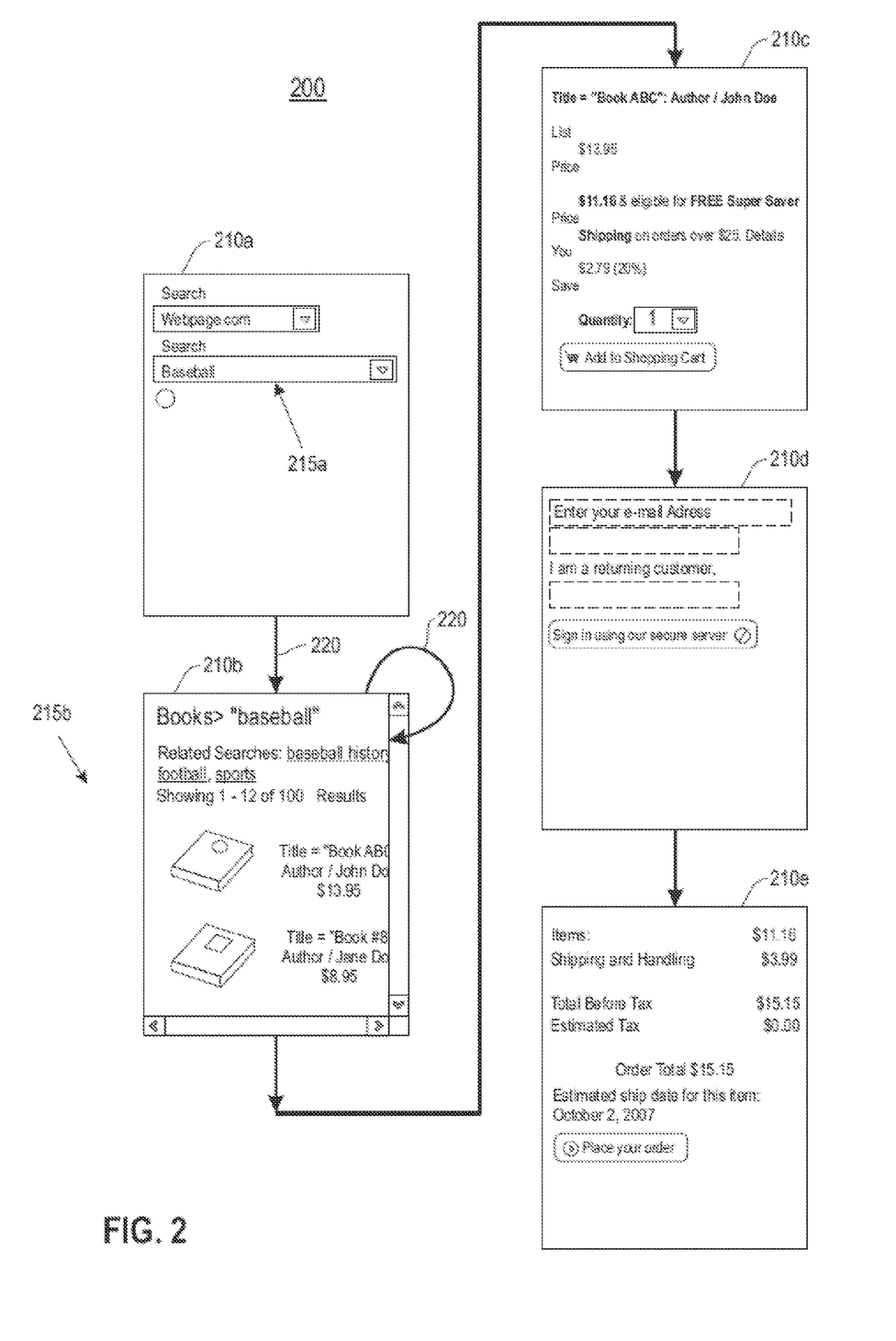
FIG. 2 is a diagram illustrating an exemplary storyboard generating according to the embodiments of the present invention.

Referring to FIG. 2, the extracted content and navigational details can be used to develop a storyboard 200 for the new webpage. Specifically, a storyboard 200 can be displayed on a GUI 26 configured with an authoring tool according to the present invention. The storyboard 200 can comprise screens 210a-e corresponding to web pages from the existing website, but with limited content. Specifically, each screen will only contain content 215a automatically extracted from the existing website and, if applicable, any additional content 215b extracted by the user. Transition events between content 415a-b and, more particularly, between screens 210a-e can be represented by arrows 220. During and/or after the storyboard is developed, the GUI 26 can further allow the user to edit the storyboard 200 (i.e., to delete or rearrange content on any given screen, to alter transitions, etc.).

As mentioned above, in addition to the first computer system 50 (and optional second computer system), the system 100 embodiments can comprise a proxy server 30 and at least one third computer system 40. The proxy server 30 can receive the computer software application for the new website, as authored, from the first computer system 50 (and/or optional second computer system) and can further store the computer software application. Those skilled in the art will recognize that a proxy server is a server (e.g., a web server) configured to process requests by users for services that are available through one or more other servers (e.g., or more other web servers). A proxy server typically requests from another server a service on behalf of the user, receives a response from the other server and, optionally, may alter the response before providing it to the user. An exemplary proxy server suitable for use in conjunction with the present invention is disclosed in U.S. patent application Ser. No. 12/013,559 of Barton et al., filed on Jan. 14, 2008, and incorporated herein by reference.

The third computer system 40 can comprise any other computer device capable of at least minimal web functionality. For example, the third computer system 40 can comprise a mobile device (e.g., a cell phone, a personal digital assistant (PDA), a handheld computer, a handheld game console, etc.). This third computer system 40 can access the computer software application for the new website through the proxy server 30 and can use it to perform the same or similar tasks as performed previously using the existing website. Specifically, in operation, a user will request content from the new website on the proxy server 30. Based on the request, the proxy server 30 will automatically navigate over internet 60 to the corresponding webpage on the existing website that contains the requested content. The response sent back to the third computer system 40 from the proxy server 30 will not include all of the contents of the corresponding webpage on the existing website. Rather, the response will include only the contents from the corresponding webpage on the existing website that were previously extracted and added to the new website during authoring (i.e., only the contents shown on a corresponding screen 210 of the storyboard 200 of FIG. 2).

Figure 3:
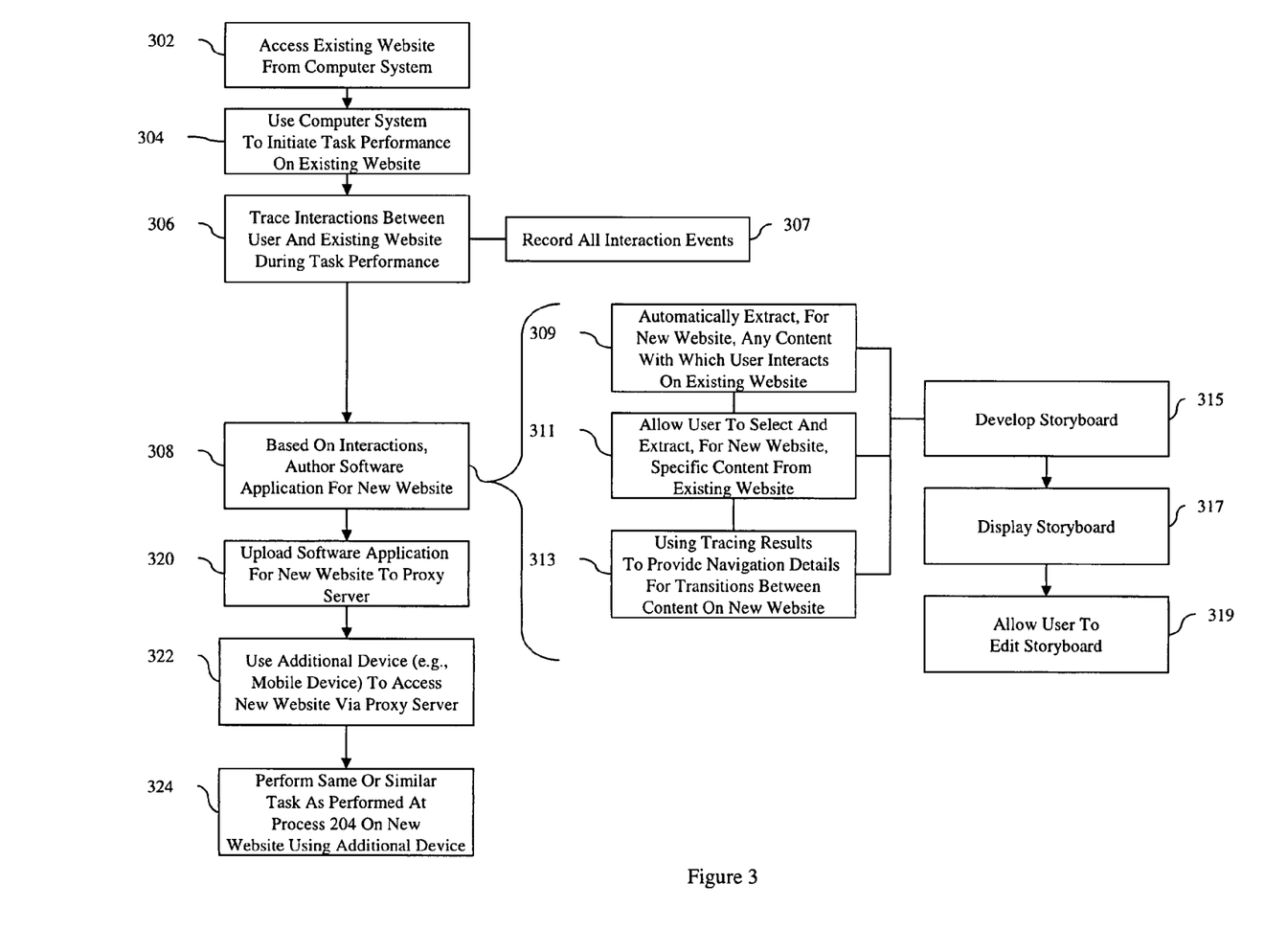
FIG. 3 is a flow diagram illustrating generally embodiments of the method of the present invention.

Also, disclosed herein are embodiments of an associated method. Referring to FIG. 3 in combination with FIG. 1, the method embodiments generally comprise accessing an existing website (302) over internet 60 and performing a task on the existing website (304). These processes can be performed by a user through a first computer system 50, as described in detail above and illustrated in FIG. 1. As the user performs the task, interactions between the user and the existing website can be automatically traced (e.g., by a monitoring device 26 on the first computer system 50) (306). That is, during this tracing process, all interaction events occurring between the user and the existing website can be recorded (e.g., on a data storage device 11, 13 within the first computer system 50) (307). Such interaction events can include, but are not limited to, activating links or buttons, filling in form fields (e.g., sign-in forms with login and password blocks, billing information forms, etc.), etc. Based on these interaction events, the computer software application for the new website is authored (e.g., by a website design application executed on the first computer system 50 and/or on an optional second computer system in communication with the first computer system) (308).

Specifically, this authoring process can comprise, during the performance of the task, automatically extracting, for the new website, any content from the existing website with which the user interacts (309). Also, during the performance of the task, the user can be allowed to select and extract, for the new website, additional content from the existing website (311). The automatically extracted and user-extracted content can be used to develop, for the new website, a storyboard (312). That is, referring to FIG. 2, a storyboard 200 comprising screens 210a-e containing both the content 215a automatically extracted from the existing website and any additional content 215b extracted by the user can be developed. Finally, the results acquired from tracing the interaction events between the user and the existing website can be used to provide the navigational details for any transitions (i.e., for any transition events) between content on the new website and, more particularly, between screens 210a-e on the storyboard 200 for the new website (313). That is, each transition (i.e., each transition event) on the storyboard 200 can be represented by an arrow 220 between two screens and can comprise navigational details made up of that series of one or more interaction events that a user performed previously in order to transition between corresponding screens on the existing website. As the storyboard is being developed and/or after the storyboard is completed it can be displayed (e.g., on the GUI 23 for the first computer system 50 configured with an authoring tool according to the present invention) and the user can be allowed to edit it (317-319).

Once the software application for the new website is authored, it can be uploaded onto and stored on the proxy server 30 (316). Those skilled in the art will recognize that a proxy server is a server configured to process requests by users for services that are available through one or more other servers. The proxy server will request the service on behalf of the user, receive a response from the other server and, optionally, may alter the response before providing it to the user. An exemplary proxy server suitable for use in conjunction with the present invention is disclosed in U.S. patent application Ser. No. 12/013,559 of Barton et al., filed on Jan. 14, 2008, and incorporated herein by reference.

Through the proxy server 30, at least one third computer system 40 (e.g., at least one mobile device) can access the new website and use it to perform the same or similar tasks as performed previously using the existing website (318-320). Specifically, in operation, a user will request content from the new website on the proxy server 30. Based on the request, the proxy server 30 will automatically navigate over internet 60 to the corresponding webpage on the existing website that contains the requested content. The response sent back to the third computer system 40 from the proxy server 30 will not include all of the contents of the corresponding webpage on the existing website. Rather, the response will include only the contents from the corresponding webpage on the existing website that were previously extracted and added to the new website during authoring (i.e., only the contents shown on a corresponding screen of the storyboard 200 of FIG. 2).

Therefore, the embodiments of the present invention (referred to hereinafter as "Highlight") enable end users to author (i.e., re-author) new lightweight web applications from existing websites simply by demonstrating how to complete their task in a desktop browser. Highlight uses the trace of a user's interaction with an application as the basis for creating a task-specific lightweight version of the existing website. This lightweight version is designed so that it is capable of being run on a mobile device or other device having limiting computing functions. By interacting with only the controls needed to accomplish a task, a user defines the set of controls that should be surfaced in the lightweight version of the web application. Since traces alone are not always sufficient to capture the richness of interaction needed, the system embodiments let users interactively "clip" (i.e., extract) portions of the original website for display in the new lightweight version, and generalize flow by specifying additional paths through the application.

A key aspect of Highlight is that it leverages a user's existing knowledge of a website. Since many of the tasks a user performs on a website are repetitive, particularly those performed on an enterprise web application, a user that is an expert at using a particular website is uniquely positioned to know how the site is used and what features of that site could be useful in a mobile version. By making the authoring interfaces as simple as demonstrating how to perform a task using a desktop browser, Highlight lowers the barrier to creating mobile web applications. This enables end users to create their own customized mobile web experience, optimized for the tasks they need to perform and for the mobile device they intent to use to access the content.

Figure 4:
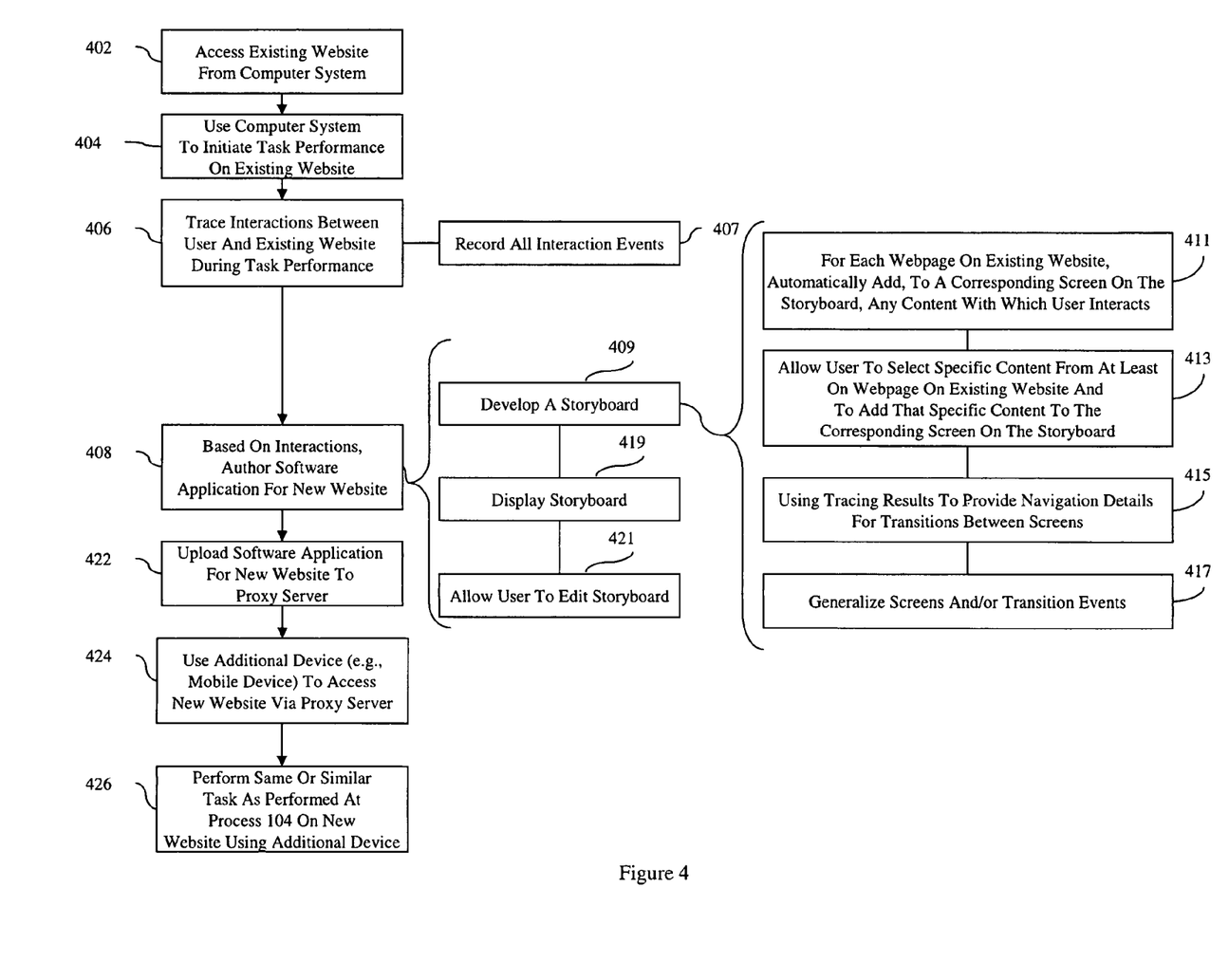
FIG. 4 is a flow diagram illustrating one particular embodiment of the method of the present invention.

Referring to FIG. 4 in combination with FIG. 1, one particular method embodiment of the present invention can again comprise accessing an existing website (402) over internet 60 and performing a task on the existing website (404). These processes can be performed by a user through a first computer system 50, as described in detail above and illustrated in FIG. 1. As the user performs the task, interactions between the user and the existing website can be automatically traced (e.g., by a monitoring device on the first computer system) (406). That is, during this tracing process, all interaction events between the user and the existing website can be recorded (e.g., on a data storage device 11, 13 within the first computer system 50) (407). Such interaction events can include, but are not limited to, activating links or buttons, filling in form fields (e.g., sign-in forms with login and password blocks, billing information forms, etc.), etc. Based on these interaction events, the computer software application for the new website can be authored (e.g., by a website design application executed by a processor 10 on the first computer system 50 and/or on an optional second computer system in communication with the first computer system 50) (408).

Specifically, this authoring process can comprise developing, for the new website, a storyboard 200 comprising screens 210*a-e* that contain content (e.g., 215*a-b*) extracted from the existing website (409, see FIG. 2). To develop the storyboard 200, some content (e.g., 215*a*) is automatically extracted and added from the existing website to the screens 210*a-e* of the storyboard 200 by the website design application. The automatically added content is any content with which the user interacts on any given webpage of the existing website. Specifically, for each particular webpage that is on the existing website and that is viewed by the user during the task performance, the method comprises automatically adding, to a corresponding screen 210 on the storyboard 200, any content 215*a* with which the user interacts (411). Additionally, to develop the storyboard 200, some content (e.g., 215*b*) is also user-extracted and added from the existing website to the screens 210*a-e* of the storyboard 200. Specifically, the user can be allowed to further select specific content from at least one particular webpage on the existing website and to add the specific content to a corresponding screen (e.g., by using an authoring tool for the website design application as displayed on the GUI) (413). Finally, navigation details for the transitions between the screens 210*a-e* on the storyboard 200 can be provided based on the traced interaction events and can be represented as arrows 220 (415). That is, each transition (i.e., each transition event) on the storyboard 200 can be represented by an arrow 220 between two screens and can comprise navigational details made up of that series of one or more interaction events that a user performed previously in order to transition between corresponding screens on the existing website.

It should be noted that, optionally, during storyboard development, multiple screens and/or multiple transition events between screens can be generalized to better control the flow of the resulting software application (417). Specifically, a process of generalizing two of the screens for the storyboard can comprise recognizing, by either the user or the website design application, that a new screen being developed is likely to match a previously developed screen. In this case, the user can select the previously developed screen for re-use rather than continuing to develop the new screen. A process of generalizing two transition events can comprise first determining if the two transition events are of a same type. If so, the path expressions for the two transition events can be examined to determine if only indices of the path expressions differ. If so, then the two transition events can be combined into a single transition event (e.g., either automatically or with user-authorization).

As the storyboard 200 is being developed and/or after the storyboard is completed, it can be displayed (e.g., on the GUI 23 for the first computer system 50 configured with an authoring tool according to the present invention) and the user can be allowed to edit it (419-421).

Once the software application for the new website is authored, it can be uploaded onto and stored on the proxy server 30 (422). Those skilled in the art will recognize that a proxy server is a server configured to process requests by users for services that are available through one or more other servers. The proxy server will request the service on behalf of the user, receive a response from the other server and, optionally, may alter the response before providing it to the user. An exemplary proxy server suitable for use in conjunction with the present invention is disclosed in U.S. patent application Ser. No. 12/013,559 of Barton et al., filed on Jan. 14, 2008, and incorporated herein by reference.

Through the proxy server 30, at least one third computer system 40 (e.g., at least one mobile device) can access the new website and use it to perform the same or similar tasks as performed previously using the existing website (424-426). Specifically, in operation, a user will request content from the new website on the proxy server 30. Based on the request, the proxy server 30 will automatically navigate over internet 60 to the corresponding webpage on the existing website that contains the requested content. The response sent back to the third computer system 40 from the proxy server 30 will not include all of the contents of the corresponding webpage on the existing website. Rather, the response will include only the contents from the corresponding webpage on the existing website that were previously extracted and added to the new website during authoring (i.e., only the contents 215a and 215b shown on a corresponding screen of the storyboard 200 of FIG. 2).

Exemplary Implementation

In an exemplary implementation of the above described method and system embodiment, as illustrated in FIGS. 1 and 4, respectively, authoring (i.e., re-authoring) is performed through a Designer extension (i.e., a website design application authoring tool) to a web browser (e.g., Firefox™, a product of Mozilla™, Mountain View, Calif.) running on a typical personal computer (PC) 50 and, more particularly, displayed on a GUI 26 of the PC 50. A user begins by visiting an existing website and demonstrating an interaction with the exiting website to include in the mobile application (402-404). As the user interacts, the Designer develops a storyboard 200 (409) (e.g., as illustrated in FIG. 2)

Specifically, the Designer automatically adds content 215a to a current "pagelet" (i.e., a current storyboard screen, e.g., screen 210a) for a mobile version of a corresponding current webpage on the existing website (411). The Designer creates new pagelets as needed. While demonstrating an interaction, the user may also choose to explicitly add additional content 215b from the existing web page to a screen (e.g., 210b) and rearrange or remove elements already in the current pagelet (413, 421). A storyboard-style interface gives the user a visual overview of the application and allows the user to return to previous locations in the mobile application. This enables the user to demonstrate alternate actions that might be taken while interacting with the mobile application or to help the Designer generalize its knowledge of interactions that were previously observed. Once the user has finished, a description of the application can be saved to a proxy server that will allow access to the application from mobile devices (422-426).

A novel feature of Highlight is that it allows users to author both the content of mobile pages and the sequences of interactions that characterize the transitions between pages. This feature allows users to create mobile applications with a page structure that differs from that of the existing website. For example, a mobile application can skip over unnecessary web pages, allowing users to perform a minimum of interaction in order to complete their task.

Exemplary Interface Walkthrough

To illustrate the use of Highlight, the following interface walkthrough is provided. In one scenario, a user (e.g., Amy) creates a mobile application using the Highlight Designer (i.e., the inventive website design application and authoring tool of the present invention) to buy a single item from an existing website (e.g., www.amazon.com, a registered trademark of Amazon.com, Inc., South Seattle, Wash.)

Figure 5:
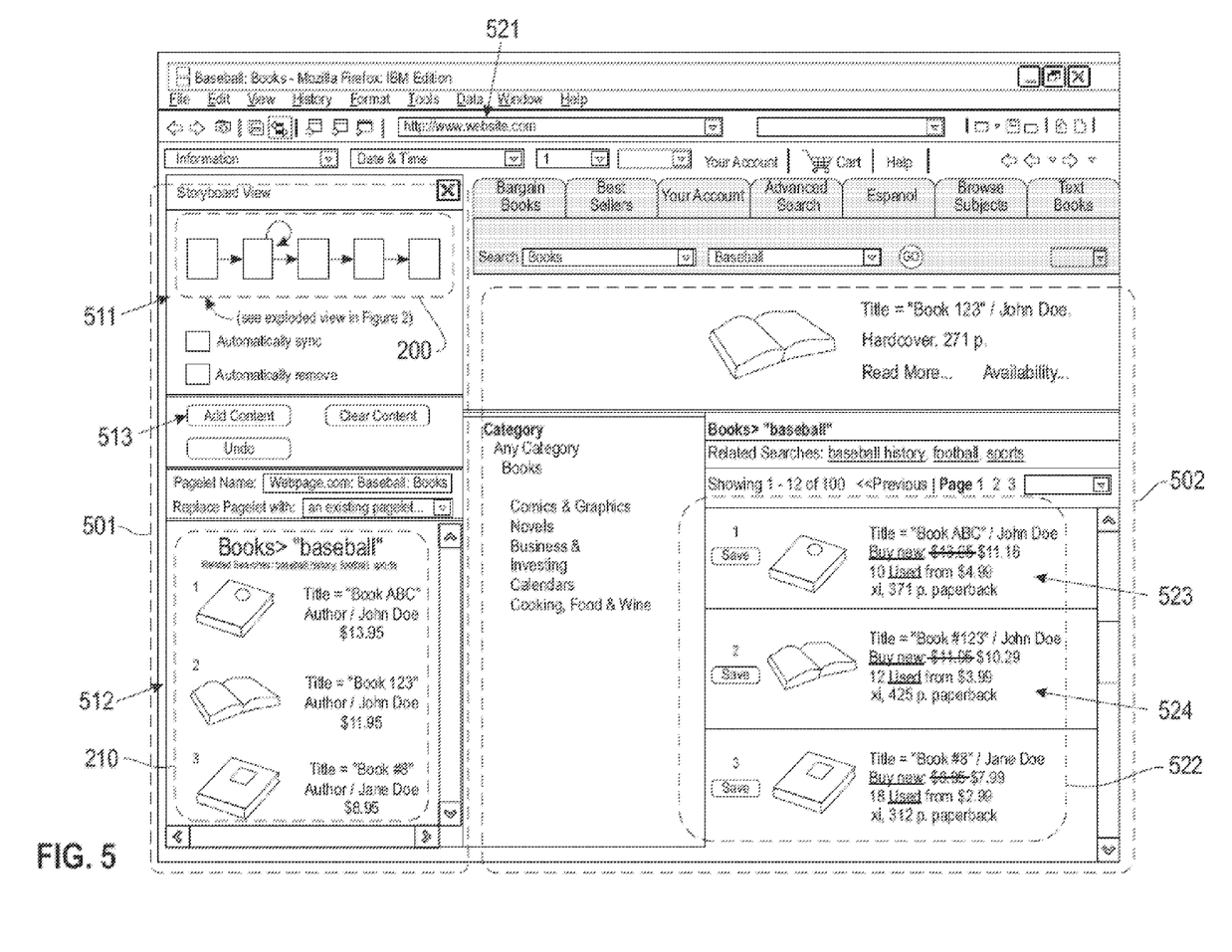
FIG. 5 is an exemplary screen page generated by a graphical user interface (GUI) configured with a website design authoring tool according to the present invention.

Reference is made in this exemplary walkthrough to the steps set out in the method of FIG. 4, to the exemplary GUI screen page illustrated in FIG. 5, and to the exemplary storyboard 200 illustrated in FIG. 2. Specifically, the Designer 501 (i.e., the inventive website design application and authoring tool of the present invention) opens in a Firefox™ sidebar to the left of the main browser window 502 (see FIG. 5). This sidebar contains two main parts: a storyboard section 511, in the top pane, and a preview browser section 512, in the bottom pane. The storyboard section 511 contains storybook 200 in-development (see also the exploded view of the storybook 200 in FIG. 2). This storybook 200 is a node-and-arrow (i.e., a screen 210-and-arrow 220) overview of the new website application being created. The preview browser section 512 shows the current pagelet (i.e., the current screen) being created in the mobile application at any given time.

Referring again to FIG. 4 in combination with FIGS. 2 and 5, Amy starts by typing "www.amazon.com" into the browser's location bar 521 and loading the retail site (404). Highlight records this event as one of the initial events required to set up the application (406). Amy then selects "Books" from the category drop-down list, types her search term into the search box and presses the "Go" button to initiate the search. As she performs these actions, the Designer 501 automatically clips the widgets with which she is interacting, as well as a label or other descriptive text that explains their use (411). Thus, the Designer 501 adds the drop-down list, the search box, labels for both, and the search button to the current pagelet 210a, and those items are displayed in the sidebar's preview browser. All of these clips are made automatically, just by virtue of Amy's trace of interactions with the website.

The search resulted in a list 522 of hits being displayed in the main browser 502. Amy wants to clip all of these results for display in the mobile application (413). She clicks the "Add Content" button 513 in Highlight. Now, as she moves the mouse over the browser, portions of the web page are highlighted in red, indicating the region of the page that would be clipped. Amy moves the mouse such that all of the results are contained within the red box, and clicks to clip that region. These search results then appear in the preview browser 512. In addition, a new pagelet 210b ("Search results") is constructed, and added to the storyboard 200. The storyboard 200 now contains two pagelets, one 210a containing the search interface, and a second 210b containing the list of search results.

Next, Amy clicks on one of the items 523 for sale on the list 522. The item page is displayed in the main browser 502. On this page, she is interested in the item information such as the name and the purchase price. She uses the "Add Content" button 513 again to clip the region containing these details to her application (413), adding a third pagelet ("Item details" 210c) to the storyboard 200.

Amy wants to be able to purchase the item 523 with her new web application from a mobile device (e.g., at process 426), so she clicks the "Add to Shopping Cart" button on the item description page. The next page is an overview of the current shopping cart. Amy's goal is to create an application for buying a single item, so she decides not to include any content from this page and clicks on the "Proceed to Checkout" button. Highlight chooses not to create a pagelet that includes this button because the page would have only included one button. Highlight does not create such pages by default because they typically add an additional navigation step without any interactive value. The click on the "Proceed to Checkout" button is recorded automatically (411), as part of the transition to the next pagelet required to "Place your order", however, which ensures that it will automatically happen when the mobile application is executed.

The next page 210d requires a login/password to continue. By typing in her amazon.com username and password, these widgets are automatically clipped (411) and used to populate the fourth pagelet 210d in the application ("Sign in"). On the next page, which is a confirmation of the order, Amy uses the "Add Content" button 513 to create a new pagelet 510e with information such as the final price of the order and the shipping address. At this point, Amy could click the "Place Your Order" button to place the order, which would also automatically add that button to her pagelet (411). Because she is just specifying an example however, she does not actually want to buy the item. Instead she uses the "Add Content" button 513 in the sidebar to highlight the "Place Your Order" button and add it to the current pagelet (413), which completes the basic structure of her application.

At any point, Amy can test her application by double-clicking on the pagelets in the storyboard 200 to return to previous pages. Returning to the "Search results" pagelet, the main browser 502 navigates back to the search result page 522, and the clipped search results are refreshed in the preview browser 512. Amy clicks on a different item this time (e.g., item 524). When she does this, Highlight detects that she has performed an action that looks very similar to an action she performed previously, and asks if she wishes to generalize them (417). By saying "yes", Amy is indicating that a click on the title link of any of the items in the list 522 on the search result pagelet should lead to the item detail pagelet. The next time she returns to the search result page 522 and clicks on a different item, she will automatically be redirected to the appropriate "item detail" pagelet (e.g., pagelet 210c for that specific item).

As a final step, Amy can add the functionality of navigating across multiple pages of search results, which is available on the amazon.com site by clicking links at the bottom of the page (415). Amy can start adding this functionality by returning to the search result pagelet 210b in the storyboard 200, and then clicking on the "Next" link at the bottom of the search results page. Clicking on the link takes the main browser 502 to the next page of search results. Amy now has two options to create the interface that she desires. She could use the "Add Content" button 513 to add the search results content to her pagelet, as she did previously. The Designer 501 will recognize that this new pagelet is similar to the previous search results pagelet, and it will ask Amy if she would like to use her previous pagelet. Answering "yes" to this question creates a looping edge from the "Search results" pagelet back to itself. Alternately, Amy could have explicitly specified that the "Search results" pagelet should be used by selecting it from the drop-down list in the preview browser. To make the rest of the search page navigation links work, Amy can click one of the other links. The Designer 501 will detect that this link click is similar to the "Next" click, and ask if she wants to generalize. By answering "yes," Amy will tell Highlight to generalize all of the search navigation links.

Through a mixture of demonstrating how she interacts with the application, and using clipping regions to select desired content on each page, Amy has constructed an application that allows her to search for and purchase items via a light weight web interface suitable for use on mobile devices. When this interface is loaded into her mobile device, she will be able to search for items by name 210b, navigate through the list of search results 210b, see item details for a particular item 210c, and purchase that item 210d-e. The interface is optimized for the task that Amy wishes to do with this new version of the existing website, and contains only the subset of the amazon.com application that is relevant to her task.

Implementation

As discussed above, Highlight Designer works by recording the interactions a user takes in the browser (i.e., the interaction events, including but not limited to, activating links or buttons, filling in form fields, etc.) and converting these actions into a mobile application description. Mobile applications are represented as a directed graph of "pagelets." Each pagelet (i.e., each screen in the storyboard for the new website) represents one particular webpage from an existing website that might be seen on the mobile device.

Pagelets (i.e., screens) are described in two parts: Content operations that describe how the pagelet's content will be constructed from the content of the page on the existing site; and Transition events that describe how the browser will transition between pagelets. Each transition events comprises navigational details made up of that series of one or more interaction events that will allow a user to transition between two pagelets. That is, transition events represent the sequence of stored interaction event(s) that were demonstrated on the existing website to reach the page from which the next pagelet's content will be clipped. Each transition event is represented by an arrow 220 on the storyboard 200 view (as shown in FIG. 2).

Content Operations

Referring again to FIG. 4 in combination with FIGS. 2 and 5, the most common content operation is extracting some content from the existing web page and adding it to a pagelet. When a user interacts with a form field, such as a textbox or a radio button, this field is clipped and automatically added to the Highlight application (411). In addition, a descriptive label is generated for some elements whose function is not obvious from their appearance alone; these include text boxes, dropdown list boxes, check boxes, and radio buttons. The label is determined by first looking for labels or captions specified in the HTML; if these are not present, heuristic rules are used to extract textual content close to the target element that might plausibly constitute that element's label (e.g., in a manner as described in Leshed, G., Haber, E., Matthews, T., and Lau, T. "Co-Scripter: Automating & Sharing How-To Knowledge in the Enterprise," in *Proceedings of CHI*, 2008. Florence, Italy, To Appear).

Content can also be clipped using the "Add content" 513 tool, rather than by directly interacting with the page (413). This form of clipping is used to add read-only content to the mobile application, such as a flight status or a weather report, or to add multiple related interactive elements simultaneously, such as the search results in the 522. Another use is to add content for future use that should not be activated at this time, such as the "Place your order" button in the exemplary interface walkthrough provided above. When the "Add content" button 513 is selected, moving the cursor around on the web page causes a red box to be drawn around the HTML element currently in focus. By moving the mouse, the user can select the target element to be clipped. Multiple elements can be clipped by invoking "Add content" 513 for each item.

The Designer 501 also supports the "move" and "remove" content operations (421), which allow users to modify content already added to the pagelet. These operations are supported by interactions in the preview browser 512. Clicking on an item will select it, and then that item can either be dragged to move it to a new location or removed by clicking the "Remove" button.

Transition Events

The Designer 501 also records the series of interactive steps (i.e., the series of interaction events) that the user demonstrated in order to transition from one pagelet to the next and stores this as a transition event (406). For example, in the exemplary interface walkthrough provided above the transition event from the "Item details" pagelet 210*c* to the "Sign in" pagelet 210*d* would contain the steps "click on the Add to Shopping Cart button" and "click on the Proceed to Checkout button." The following steps would have been recorded from the "Sign in" pagelet to the final "Confirm Order" pagelet: "enter <username> into the Login: textbox," "enter <password> into the password textbox," and "click the Login button." Note that all of the user's operations are stored in the transition event, even those that may have caused some content to be clipped into the pagelet. All of these steps are included in the transition event so that the Designer 501 can keep the browser 502 and application in sync when the user double-clicks in the storyboard interface 511. Each transition event contains steps that were recorded from when the user created or navigated to the current pagelet and end when the user creates or navigates to a new pagelet.

Identifying Elements on a Web Page

Both content operations and transition events must be able to identify web page elements in a repeatable manner. This allows the same content to be clipped for a pagelet every time it is shown and allows the steps specified by an event to be replicated properly on the web page.

The Highlight Designer uses a combination of two approaches to identify web page elements: XPath (i.e., XML path language) expressions (e.g., as discussed in Clark, J. and DeRose, S., "XML Path Language (XPath), Version 1.0," 1999, and as defined by World Wide Web Consortium W3C®) and a heuristic representation ("slop") (e.g., as discussed in Leshed, G., Haber, E., Matthews, T., and Lau, T. "Co-Scripter: Automating & Sharing How-To Knowledge in the Enterprise," in *Proceedings of CHI*, 2008, Florence, Italy, to Appear).

XPath has the capability of precisely describing any element on a web page, but its expressions are often prone to failure if the page structure changes even slightly. CoScripter's slop uses textual descriptions and heuristics to identify elements on the page (e.g., "the Advanced link" refers to an <a> element containing the text "Advanced"). CoScripter slop is much more robust to page changes; however, it was designed to identify small functional elements, such as textboxes and buttons, so it is not capable of describing non-interactive content regions on the page. Because slop interpretation is heuristic, it is possible that in some cases the interpreter will produce an incorrect match, creating an application that does not work even though it might appear that it should.

Slop is a good match for transition events because it was designed to represent traces of interactions with web pages. Both the slop representation and an XPath expression can be recorded for each event. If the XPath expression fails to find the correct element, then Highlight can recover by trying to interpret the slop instead. However, it should be understood that slop is less useful for representing content operations such as clipping a region of the page. Because Co-Scripter's focus has been on capturing user interactions with a web page, it does not contain instructions for selecting arbitrary content on the page. Although the slop interpreter is enhanced in Highlight to be able to understand human-written instructions, such as "clip the table containing Flight Status", devising intelligent algorithms for recording slop based on user demonstrations is difficult. Thus, Highlight relies on XPath expressions to specify elements that are the targets of content operations. It is an area of future work to incorporate more robust methods for describing regions to be clipped.

Generalizing Transition Events and Pagelets (417)

Many web applications have repetitive page structures, such as the search pages we saw in the exemplary interface walkthrough provided above. There are two types of repetition that that can be supported (i.e., generalized (417)) with the Highlight Designer 501. Some sites have multiple paths to get to the same type of page. For example, the "Item details" page on amazon.com can be reached both from searching and browsing through the site's product hierarchy. Some pages, such as pages of search results, contain repetitive blocks of content. Often there will be similar interaction elements in each of these blocks, such as a link on a heading, that lead to a similar page.

To support creating a mobile application for websites with these characteristics, a set of lightweight interactions are added that would allow users to specify that an existing pagelet should be re-used and that a set of links all lead to the same pagelet.

Two different techniques for allowing users to specify that a pagelet should be re-used are disclosed. These methods are both needed once the user has navigated to a new page and is about to clip content to create a new pagelet. The first method is explicit. If the user immediately recognizes that they wish to re-use a pagelet, then they can select that pagelet from a drop-down list in the sidebar and the existing pagelet will immediately be applied. The second method is implicit. If the user does not recognize that an existing pagelet might be re-used, then they will begin clipping content from the new page into the pagelet. The Designer 501 will analyze the XPath locations of the content as it is clipped, and if it appears to match a previous pagelet then the system will offer to replace the new pagelet with the old one. To reduce annoyance, the system will only ask this question once for each new pagelet.

In order to specify that a set of links all should lead to the same pagelet, the user must first specify a trace using one of the links in the set. In the amazon.com example above, remember that Amy clicked on the first result and created a pagelet for the result item before returning to the search results pagelet. When the user returns to the results pagelet and clicks on another link in the set, Highlight will analyze the new event and compare it to previous events. Specifically, it will look for similarities in the event interactions that caused the mobile pagelet to advance to a next page.

An exemplary algorithm for detecting similarities in events is as follows. First, test to see if the events were of the same type. Clicking a link cannot be the same as pressing a submit button, for example. Second, examine the XPath expressions of the elements involved in the two events. For example, in the amazon.com example the XPaths for the two search result links were:

First link: /HTML[1]/ . . . /TBODY[1]/TR[1]/TD[1]/A[1]
Second link: /HTML[1]/ . . . /TBODY[1]/TR[2]/TD[1]/A[1]

The Designer 501 considers events to be generalizable if the XPath expressions differ only in the indices, such as for the TR element in the exemplary interface walkthrough provided above. This means that the elements are located in much the same place in the web page but are offset by some repetition of structure. Often this will occur when items are located in the same relative location within different cells of a table. The particular indices at which the elements differ are saved.

If the events are generalizable, then the system will identify the pagelet to which the previous event leads and ask the user if that pagelet should be the target for all similar links. If the user says "yes," then the two events are combined into a single event. The new event remembers the XPath indices that differed between the two events that created it and any future interaction with an element that has an XPath that differs only in those indices will cause the mobile application to follow that event. In our experience, this mechanism has worked well for a variety of search result pages, and has also been shown to be useful in other contexts, such as category browsing pages with many links. This heuristic does have limitations however, particularly in situations where repeating chunks of content are not completely identical. For example, some forms of eBay searches will return a list of results, but the format of each particular item in the list will vary depending on the auction type for that item.

Architecture

Referring to FIG. 1, in order to make mobile applications available outside of the website design application on the first computer system 50, a proxy server 30 component serves mobile applications based on existing sites. Specifically, when a user wishes to access a mobile application from a mobile device 40, they navigate a browser on their mobile device 40 to the proxy server's main page, select their application from a list of available applications, and then proceed to use the application.

The proxy server component 30 and the application descriptions it uses can be implemented, for example, in the same manner as the proxy server disclosed in U.S. patent application Ser. No. 12/013,559 of Barton et al., filed on Jan. 14, 2008, and incorporated herein by reference. Specifically, the proxy server 30 is implemented as a typical web server that contains a fully functional web browser (e.g., a Firefox™ web browser) as a component. Selecting an application establishes a session with the web server 70 for the existing website and causes the proxy server's 30 Firefox™ browser to automatically navigate to the webpage of the existing website that corresponds with the first pagelet (e.g., screen 210a of FIG. 2) in the mobile application, execute the content operations of that pagelet, and return the HTML of this content to the mobile device 40. Subsequent requests from the mobile device 40 are matched to a transition event for the current pagelet, any form data from the mobile device 40 is filled in appropriately, and then the proxy server's 30 browser advances to the next page based on the interactions specified by the event. Thus, the interface between the proxy server 30 and the mobile device 40 is similar to a remote control in that each request by the mobile browser specifies a series of user interface operations for the proxy browser to perform in order to get the contents of the next mobile page. For example, the proxy server 30 might fill in some form fields, press the submit button, and navigate through several subsequent pages before the constructing the next mobile page.

The use of a proxy server 30 provides several advantages. First, only the clipped content (i.e., not all the content from the webpage) is sent to the mobile device 40, resulting in fast load times despite slow network connections. Second, because the browser running on the proxy server 30 is a full-fledged desktop browser, any "client-side" JavaScript (JavaScript is a registered trademark of Sun Microsystems, Inc., Santa Clara, Calif.) from the existing website can be executed in place, rather than relying on the mobile device's (often poor) JavaScript support. This feature enables the proxy server 30 to serve mobile versions of Ajax (i.e., asynchronous JavaScript and XML) applications.

Integration with IBM's CoScripter

Since Highlight makes use of traces of user interaction with web applications to construct interfaces (see step 415 of FIG. 4), it can be extended to make use of a large repository of such traces as collected, for example, in the CoScripter project (see Leshed, G., Haber, E., Matthews, T., and Lau, T. "CoScripter: Automating & Sharing How-To Knowledge in the Enterprise," in *Proceedings of CHI*, 2008, Florence, Italy, To Appear). Specifically, CoScripter is a programming by demonstration system for Firefox™ that records user actions performed in the browser and saves them as pseudo-natural-language scripts. CoScripter's representation for scripts is a plaintext language with steps consisting of commands, such as, "go to http://google.com" (Google.com is a registered trademark of Google, Inc., Mountain View, Calif.), "type coscripter into the search box", and "click the Search button". These steps are both human and machine-understandable, resulting in scripts that are easy for people to understand yet interpretable by a machine.

Scripts are automatically saved to a central wiki for sharing with other users. The CoScripter community has created thousands of scripts for web-based tasks such as checking stock prices, creating trouble tickets, and managing queues in a call center. This repository of scripts provides a wealth of information about the tasks people do with web applications. It also provides an excellent starting point for the creation of Highlight applications, particularly if CoScripter users import their scripts into Highlight and, with little or no effort, be able to complete their tasks from a mobile device.

Thus, there are advantages to integrating CoScripter into Highlight to create a new application from a CoScript. When a script is loaded, Highlight can use CoScripter's interpretation component to programmatically run through the script, clicking on buttons and entering text as if the user had done these actions directly. Meanwhile, Highlight can record the actions and uses them to construct an initial application.

One piece missing from the CoScripter language was the ability to specify portions of the content of the web page to be clipped, akin to using Highlight's "Add content" tool. Thus, CoScripter's language is extended herein with an additional type of instruction to describe regions to be clipped. These instructions take the form "clip the table containing Flight Status", and are parsed by Highlight and turned into an XPath expression that select the smallest table element in the document that contains both the words "Flight" and "Status".

With this addition to the CoScripter language, users are able to import scripts directly from the CoScripter wiki into Highlight and have a fully-functional mobile application with no additional authoring work. Once the script has been imported into Highlight, any of Highlight Designer's interactive features can be used to modify the application in order to customize it further for one's mobile device.

This integration reduces the cost of authoring mobile applications even further, because Highlight users are able to take advantage of already-created scripts for completing common tasks on the web.

Also, disclosed herein is a computer program product comprising a computer usable medium having computer useable program code embodied therewith. The computer usable program code is configured with an inventive website design application and can be executed by the processor 10 of the computer system 50 to perform the above-described method for authoring of a computer software application for a new website. More specifically, the embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a system and method that enables end users to create task-based mobile web applications simply by demonstrating how to perform a task on an existing application. The embodiments use the trace of a user's interaction to automatically clip the relevant controls for presentation in the mobile application, and enable users to visually point and select non-interactive content for inclusion in the application as well. Moreover, the embodiments have been integrated with an existing repository of traces from the CoScripter system, which can be used to create mobile versions of existing applications with little or no additional effort. In short, the embodiments enable ordinary users to mobilize their tasks and take them on the road wherever they go.

By using embodiments of the present invention, working mobile applications can be created from both popular and niche websites. One benefit to using Highlight is that task-driven mobile interfaces can reduce screen clutter to only those controls that are necessary for the task at hand. The reduction is greatest for large, multi-purpose websites where Highlight's task focus makes it possible for the user to concentrate on the elements that are required for the task at hand, and ignore all the elements used to access irrelevant portions of the application. Another benefit to using Highlight is increased access speeds. That is, because the mobile applications are authored and reduced in size prior to being requested and transmitted to a mobile device, they can be downloaded faster. Faster download times results in decreased costs.

What is claimed is:

1. A computer-implemented method of authoring a computer software application for a new website, said method comprising:

automatically tracing, by a monitoring device on a first computer system, interaction events between a user and an existing website, during performance of a task on said existing website; and, based on said interaction events, authoring, by a website design application executed on at least one of said first computer system and a second computer system in communication with said first computer system, said computer software application for said new website, said authoring comprising:

during said performance of said task, automatically extracting, for said new website, any content from said existing website with which said user interacts;

during said performance of said task, further allowing said user to select and extract, for said new website, additional content from said existing website; and using results of said tracing of said interaction events to provide navigational details for transitions between content on said new website.

2. The method of claim 1, further comprising uploading, onto a proxy server, said computer software application for access by a third computer system.

3. The method of claim 1, wherein, for each transition, said navigational details comprise a series of one or more of said interaction events.

4. The method of claim 1, said authoring further comprising: developing, for said new website, a storyboard comprising screens with said any content automatically extracted from said existing website and with said additional content extracted by said user.

5. The method of claim 4, further comprising displaying said storyboard.

6. The method of claim 4, further comprising allowing said user to edit said storyboard.

7. A computer-implemented method of authoring a computer software application for a new website, said method comprising:

performing, by a user, a task on an existing website accessed through a first computer system;

automatically tracing, by a monitoring device on said first computer system, interaction events between said user and said existing website, during said performing of said task; and, based on said interaction events, authoring, by a website design application executed on one of said first computer system and a second computer in communication with said first computer system, said computer software application for said new website, said authoring comprising:

developing, for said new website, a storyboard comprising screens with content extracted from said existing website, said developing comprising, for each webpage on said existing website viewed by said user during said performing of said task, automatically adding, to a corresponding screen on said storyboard, any content with which said user interacts;

allowing said user to further select specific content from at least one webpage on said existing website and to add said specific content to said corresponding screen; and providing navigation details for transitions between said screens based on said tracing of said interaction events.

8. The method of claim 7, further comprising uploading, onto a proxy server, said computer software application for access by a third computer system.

9. The method of claim 7, further comprising displaying said storyboard.

10. The method of claim 7, further comprising allowing said user to edit said content on said storyboard.

11. The method of claim 7, wherein, for each transition, said navigational details comprise a series of one or more of said interaction events.

12. The method of claim 7, said authoring further comprising generalizing at least one of multiple screens from said storyboard and multiple transition events between said screens.

13. A system for authoring, storing and accessing a computer software application for a new website, said system comprising:

a first computer system comprising a monitoring device tracing interaction events between a user and an existing website, during performance of a task on said existing website; and at least one of said first computer system and a second computer system in communication with said first computer system comprising at least one processor executing a website design application for authoring said computer software application for said new website based on said interaction events, said authoring comprising:

during said performance of said task, automatically extracting, for said new website, any content from said existing website with which said user interacts;

during said performance of said task, further allowing said user to select and extract, for said new website, additional content from said existing website; and using results of said tracing of said interaction events to provide navigational details for transitions between content on said new website.

14. The system of claim 13, further comprising a proxy server receiving said computer software application for said new website from said at least one of said first computer system and said second computer system and storing said computer software application.

15. The system of claim 14, further comprising a third computer system accessing said computer software application for said new website through said proxy server in order to allow said user to perform said task on said third computer system.

16. The system of claim 13, said authoring further comprising: developing, for said new website, a storyboard comprising screens with said any content automatically extracted from said existing website and with said additional content extracted by said user.

17. The system of claim 16, said at least one of said first computer system and said second computer system further comprising a graphical user interface displaying said storyboard.

18. The system of claim 16, said graphical user interface further allowing said user to edit said storyboard.

19. The system of claim 13, wherein, for each transition, said navigational details comprise a series of one or more of said interaction events.

20. A computer program product comprising a non-transitory computer usable medium having computer useable program code embodied therewith, said computer usable program code being configured to perform a method for authoring of a computer software application for a new website, said method comprising:

automatically tracing, by a monitoring device on a first computer system, interaction events between a user and an existing website, during performance of a task on said existing website; and, based on said interaction events, authoring, by a website design application executed on at least one of said first computer system and a second computer system in communication with said first computer system, said computer software application for said new website, said authoring comprising:

during said performance of said task, automatically extracting, for said new website, any content from said existing website with which said user interacts;

during said performance of said task, further allowing said user to select and extract, for said new website, additional content from said existing website; and using results of said tracing of said interaction events to provide navigational details for transitions between content on said new website.

* * * * *